Figure 1:
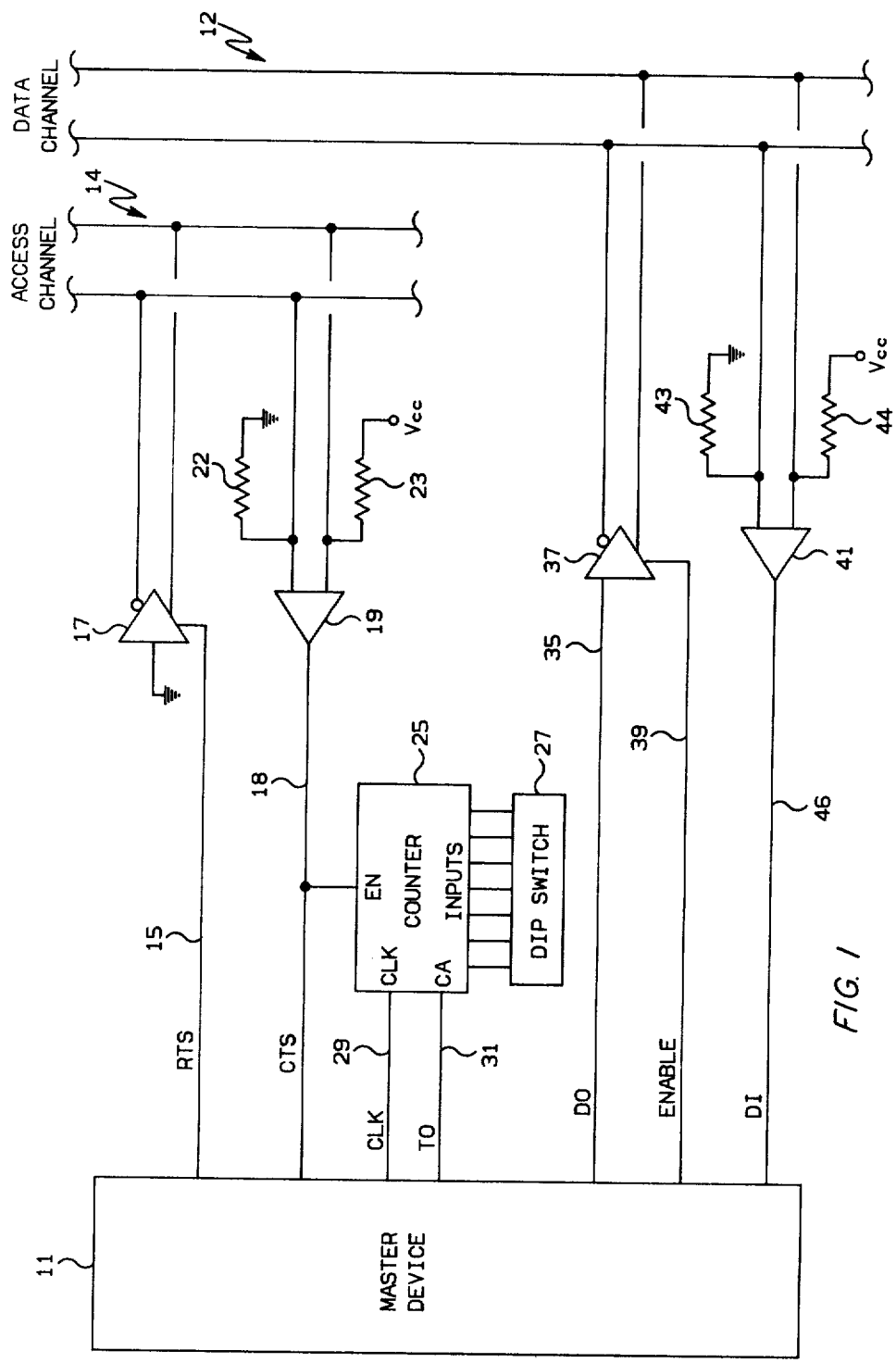

United States Patent [19]
Beauford et al.

[11] 4,359,731
[45] Nov. 16, 1982

[54] COMMUNICATION LINK CONTENTION RESOLUTION SYSTEM

[75] Inventors: Martin H. Beauford; Thomas V. Fritts, both of Bartlesville, Okla.

[73] Assignee: Phillips Petroleum Company, Bartlesville, Okla.

[21] Appl. No.: 180,253

[22] Filed: Aug. 22, 1980

[51] Int. Cl.³ .......................... H04Q 9/00; H04J 3/16
[52] U.S. Cl. ................ 340/825.51; 370/85; 364/200
[58] Field of Search ........ 340/147 LP, 147 R, 825.51, 340/825.50; 370/94; 371/47

[56] References Cited

U.S. PATENT DOCUMENTS

| | | | |
|---|---|---|---|
| 3,639,904 | 2/1972 | Arulpragasan | 370/86 |
| 3,728,681 | 4/1973 | Fuller et al. | 370/86 |
| 3,757,301 | 9/1973 | Regan et al. | 340/825.51 |
| 3,764,918 | 10/1973 | Evans et al. | 328/37 |
| 3,764,981 | 10/1973 | Jakasugi | 340/825.51 |
| 3,832,689 | 8/1974 | Means et al. | 340/147 LP |
| 3,863,220 | 1/1975 | Osawa et al. | 37/86 |
| 4,148,011 | 4/1979 | McLagan et al. | 340/825.5 |
| 4,212,080 | 7/1980 | Milliken | 340/147 LP |
| 4,313,196 | 1/1982 | Oblonsky | 370/85 |

OTHER PUBLICATIONS

*IBM Technical Disclosure Bulletin*, vol. 20, No. 2, Jul. 1977, pp. 853-855, "Decentralized Request Resolution Mechanisms", D. F. Bantz.
*IBM Technical Disclosure Bulletin*, vol. 18, No. 3, Aug. 1975, pp. 767-768 "Device for Fast I/O Selection", P. Favre.
*Electronic Engineering*, vol. 50, No. 606, May 1978, pp. 41-43, "A Simple Data Bus for Low Data Rates", C. Muller.

*Primary Examiner*—Donald J. Yusko

[57] ABSTRACT

Each of a plurality of programmable master devices having access to a data communication link is assigned a unique address based on the priority of that master device. Each of the plurality of programmable master devices is also interfaced to an access channel. Each of the plurality of programmable master devices can try to gain control of the data link by activating the access channel. The unique address of each programmable master device provides a means by which the highest priority master devices can lock out the lower priority master devices so as to prevent simultaneous transmission on the data link and also prevent loss of high priority data even when a lower priority programmable master device is the device which has activated the access channel.

10 Claims, 2 Drawing Figures

COMMUNICATION LINK CONTENTION RESOLUTION SYSTEM

This invention relates to data communication. In one aspect this invention relates to method and apparatus for synchronizing access to a data communication link between multiple master devices. In another aspect this invention relates to method and apparatus for insuring that high priority data is not lost.

As used herein the term "master device" refers to a programmable device which has the capability both to transmit and receive data and has the capability to initiate a data transaction. It is well known to connect a plurality of such devices together on a single data bus in such a manner that the devices can transmit data to each other or receive data from each other. Passive slave devices may also be connected to the data bus but in general these devices cannot initiate a data transaction.

Various problems may arise in systems where a plurality of master devices are linked together by a single data bus. The master devices may try to communicate simultaneously on the data bus and thus interfere with each other. Also, in a system where the data provided from one master device has priority over data provided from other master devices, the priority data may be lost because lower priority data is being transmitted on the bus at the same time that the higher priority data is ready for transmission.

It is thus an object of this invention to provide method and apparatus for synchronizing access to a data communication link between multiple master devices. It is another object of this invention to provide method and apparatus for insuring that high priority data is not lost.

In accordance with the present invention method and apparatus is provided whereby each master device having access to the data link is assigned a unique address based on the priority of that master device. The unique address of each master device provides a means by which the highest priority master devices can lock out the lower priority master devices so as to prevent simultaneous transmission on the data communications link and also prevent loss of high priority data. This is generally accomplished by interfacing each master device to an access channel communications link. When a master device desires to initiate a data transaction, the access channel is driven to an active state which presets timers associated with each one of the master devices to the unique priority address for the associated master device. The access channel is then released to enable each of the timers to begin counting at the same time and the same frequency. When each timer times out, the associated master device has a unique time period to gain control of the data communication link and complete a data transaction if a higher priority device has not gained control of the data communication link.

Figure 2:
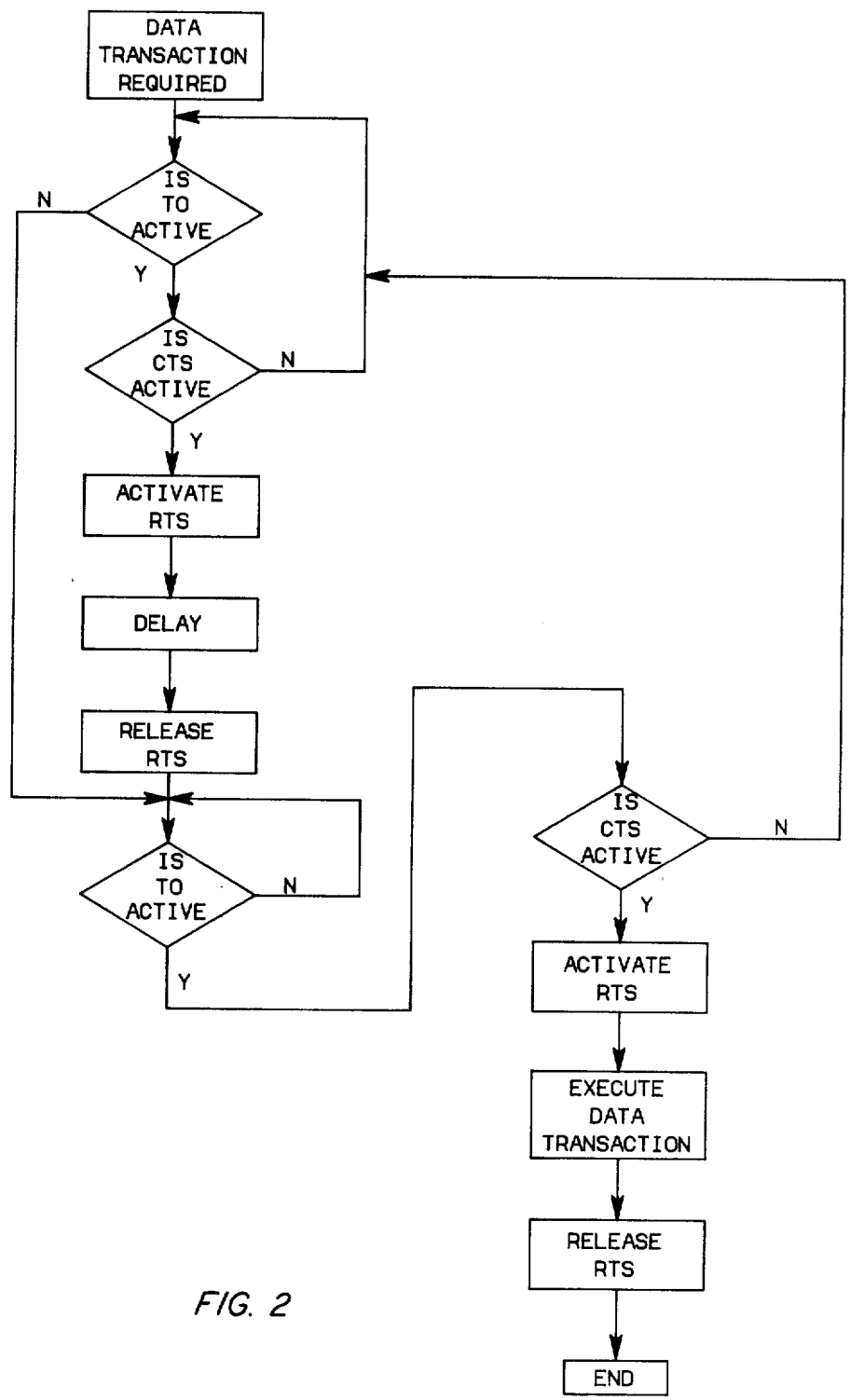

Other objects and advantages of the invention will be apparent from the foregoing brief description of the invention and the claims as well as the detailed description of the drawings in which:

FIG. 1 is a simplified diagrammatic illustration of the contention resolution system; and FIG. 2 is a logic flow diagram for the contention resolution system.

The invention is described in terms of specific electronic components and specific computer systems. However, the invention is applicable to different electronic circuit configurations which carry out the purpose of the present invention and is also applicable to different circuit components and different computer systems which are supplied by a plurality of vendors.

Referring now to the drawings and in particular to FIG. 1, there is illustrated a master device 11. For the sake of convenience only one master device is illustrated, but it should be recognized that there will be at least two master devices in the system and possibly a large number of master devices. As has been previously stated, the master device must have the capability to initiate a data transaction on the data channel 12 which is a wire pair. Almost any programmable system may be utilized as the master device 11 so long as the system has the capability to receive and transmit data and also has the capability to generate the request-to-send (RTS) signal and receive a clear-to-send (CTS) signal such as described in EIA Standard RS-232-C, published August 1969 by the Engineering Department of the Electonic Industries Association. Again, almost all programmable systems which have the ability to transmit and receive data have the capability of generating the request-to-send signal which is indicative of a desire to initiate a data transaction and also have the capability to receive a clear-to-send signal which indicates that a particular data channel may be accessed. A system such as the 6800 Microprocessor System together with the 6820 Pheripheral Interface Adapter and the 6850 Asynchronous Communications Interface Adapter all of which are manufactured by Motorola Semiconductor are a particular example of a system which may be utilized as the master device 11. The use of the 6800 Microcomputer family is fully described in M6800 Microcomputer System Design Data, published by Motorola Semiconductor Products, Inc. in 1976.

The access channel 14 illustrated in FIG. 1 is also a two-wire pair. The request-to-send signal 15 is interfaced to the access channel 14 through the line driver 17. The clear-to-send signal 18 is provided to the master device 11 through the interface made up of the line receiver 19 and resistors 22 and 23. The clear-to-send signal 18 is also provided to the enable input of the presettable binary counter 25.

The inputs of the presettable binary counter 25 are tied to the digital inline package (DIP) switch 27. The DIP switch 27 can be utilized to preset the binary counter 25 to some desired number. In operation, the counter 25 is preset to a number which is representative of the priority address of the master device 11. Preferably, higher priority master devices have lower numbers although this could be easily reversed if desired.

A clock signal is provided from the master device 11 to the clock input of the counter 25. A similar clock signal is provided to all of the counters associated with each of the master devices in the system. All of the clock signals will have the same frequency. Thus, each of the counters associated with the master devices will count at the same frequency. A time-out (TO) signal is provided from the carry output of the counter 25 to the master device 11. The time-out signal 31 provides an indication to the master device 11 that the counter 25 has completed a specified count from the number to which the counter was preset. Essentially, the counter 25 is preset to a number. When the counter is in enabled through the enable input by the clear-to-send signal 18, the counter begins the count at the frequency of the clock signal 29. When the counter 25 reaches a specified count (usually zero), the time-out signal 31 goes to a state which indicates to the master device that the counter has reached the specified count.

Data is provided from the master device 11 through the DO output 35 and the line driver 37 to the data channel 12. The line driver 37 is enabled by the enable signal 39 when it is desired to transmit data on the data channel 12. Data is provided to the master device 11 through the data input line 46 and the interface which is made up of the combination of the line receiver 41 and resistors 43 and 44.

Operation of the apparatus illustrated in FIG. 1 will be described in conjunction with the logic flow diagram illustrated in FIG. 2. The logic illustrated in FIG. 2 is implemented by means of a software program. The various signals illustrated in FIG. 1 are referred to as being in the active or inactive state. These states are generally certain voltage levels with the most commonly used being a +5 volts for the active state and approximately 0 volts for the inactive state. Obviously, other voltages and relations could be utilized if desired.

For the logic sequence illustrated in FIG. 2, the clear-to-send signal is active when the access channel is inactive. When the request-to-send signal goes active, the access channel is driven to an active state and the clear-to-send signal goes inactive. Thus the clear-to-send signal is active when the request-to-send signal is inactive. Obviously, other relationships between the state of the clear-to-send signal, the state of the request-to-send signal and the state of the access channel could be utilized if desired.

For the sake of illustration it is first assumed that the master device 11 desires to initiate a data transaction. This has the effect of initiating the logic illustrated in FIG. 2. The master device 11 first examines the state of the time-out signal 31. If the time-out signal 31 is inactive, the counter 25 has been enabled and is counting down. This is an indication that another master device is trying to gain control of the data channel 12. If the time-out signal 31 is inactive, the logic branches to the second examination of the state of the time-out signal 31 which effectively allows the logic to wait until the counter 25 has timed out before the logic sequence continues. If the time-out signal 31 is active, then the state of the clear-to-send signal 18 is examined. If the clear-to-send signal is inactive then the logic returns to the beginning and again examines the state of the time-out signal 31. This is an indication that another master device is completing a data transaction.

If the clear-to-send signal 18 is active then the master device 11 activates the request-to-send signal 15 which activates the access channel 14. This has the effect of driving the clear-to-send signal 18 to an inactive state which has the effect of presetting the counter 25 to its priority address. When the access channel 14 is activated all other counters associated with various master devices in the system are also set to their priority address.

After the delay which insures that all counters in the system have been preset, the master device 11 releases the request-to-send signal 15 and allows the access channel 14 to return to an inactive state. The clear-to-send signal returns to an active state and enables the counter 25 to begin counting. All counters begin counting at essentially the same time and at the same rate.

The master device 11 then monitors the time-out signal 31 until the time-out signal 31 becomes active. The logic then again examines the state of the clear-to-send signal. If the clear-to-send signal is inactive, this is an indication that a higher priority device has activated its request-to-send signal and is thus taking control of the data channel 12. If the clear-to-send signal is inactive the logic branches to the beginning point again to repeat the above steps in another attempt to gain control of the data channel 12.

If the clear-to-send signal is active, then the master device 11 activates its request-to-send signal 15 and thus acquires control of the data channel 12. The master device 11 then executes one data transaction and then releases the request-to-send signal 15. If the master device 11 needs further access to the data channel 12 then the logic sequence illustrated in FIG. 2 is repeated. In this manner, access to the data channel 12 is synchronized and the master devices having the highest priority can always lock out master devices having lower priority so as to insure that high priority data is not lost.

The length of the data transaction will generally be determined by the particular system to which the present invention is applied. Thus, the length of the data transaction can vary from the time required to transmit one bit of information to the time required to transmit a large number of bits of information depending upon the particular system. A large number of master devices can be interfaced to the access channel 14 and the data channel 12. The system is limited only by the capacity of the counters or timers used and the consideration that low priority data transactions may never by completed if there are a large number of higher priority devices on the access channel and data channel. The system does require that each master device must be assigned a unique priority address and thus the capacity of the counters or timers which may be utilized may limit the system.

The invention has been described in terms of a preferred embodiment as is illustrated in FIGS. 1 and 2. The invention is not limited to the schematic illustrated in FIG. 1 and further is not limited to the precise logic illustrated in FIG. 2. It is well known that there are many circuit configurations which can be utilized to perform specified functions. This is especially true with regard to many elements in the circuits which are supplied by a plurality of manufacturers.

Specific electrical components which can be utilized in the circuit illustrated in FIG. 1 are as follows:

| | |
|---|---|
| Master Device 11 | MC6800 Microprocessor, |
| | MC6820 Peripheral Interface Adapter |
| | MC6850 Asynchronous Interface Adapter |
| | (Motorola Semiconductor) |
| Counter 25 | SN74163 (Texas Instruments) |
| DIP Switch 27 | 76SB07 (Grayhill Inc.) |
| Line Drivers 17 and 37 | AM26LS30 (Advanced Micro Devices) |
| Line Receivers 19 and 41 | AM26LS32 (Advanced Micro Devices) |
| Resistors 22, 23, 43 and 44 | 220 K ohms |

While the invention has been described in terms of the presently preferred embodiment, reasonable variations and modifications are possible by those skilled in the art within the scope of the described invention and the appended claims.

That which is claimed is:

1. Apparatus for sychronizing access to a data communication link between a plurality of programmable master devices which each have the capability of initiating a data transaction on said data communication link, said apparatus comprising:
- an access channel communication link;
- means for interfacing each one of said programmable master devices to said access channel in such a manner that each one of said programmable master devices can both determine the state of said access channel and control the state of said access channel, wherein said access channel has a first state when any one of said programmable master devices desires to initiate a data transaction and has a second state when none of said programmable master devices desires to initiate a data transaction;
- a plurality of timer means, each one of said plurality of timer means being associated with a respective one of said programmable master devices;
- means for setting each one of said plurality of timer means to a different time when any one of said programmable master devices desires to initiate a data transaction and drives said access channel to said first state, the time to which each one of said plurality of timer means is set being determined by the priority of the programmable master device with which the timer means is associated;
- means for supplying a clock signal to each one of said timer means, all of said clock signals having the same frequency, all of said timer means counting at the same rate when said access channel is released to said second state after being driven to said first state to set each one of said plurality of timer means to a different time;
- means for informing each one of said programmable master devices when its associated timer means has timed out, wherein the different times at which said plurality of timer means were set provides a unique time slot for each one of said programmable master devices to gain control of said data communication link to execute a data transaction if a higher priority programmable master device has not already gained control of said data communication link.

2. Apparatus in accordance with claim 1 wherein both said data communication link and said access channel communication link are wire pairs.

3. Apparatus in accordance with claim 2 wherein said means for interfacing each one of said programmable master devices to said access channel communications link comprises means for supplying a request to send signals from said master device to said access channel communication link, said access channel communication link being in an active state when said request to send signal is in an active state and said access channel communication link being in an inactive state when said request to send signal is in an inactive state; and
- means for providing a clear-to-send signal representative of the state of said access channel to said programmable master device, said clear-to-send signal being in an active state when said access channel is in an inactive state and said clear-to-send signal being in an inactive state when said access channel is in an active state.

4. Apparatus in accordance with claim 3 wherein said timer means is a presettable binary counter.

5. Apparatus in accordance with claim 4 wherein said means for setting each one of said plurality of timer means to a different time comprises a DIP switch interfaced to the input of said presettable binary counter means, wherein the setting of said DIP switch is loaded into said presettable counter means when said clear-to-send signal goes to an inactive state and wherein said presettable counter means begins to count when said clear-to-send signal returns to an active state.

6. Apparatus in accordance with claim 5 wherein said means for informing each one of said programmable master devices when its associated timer means has timed out comprises means for supplying a time-out signal from the carry output of each one of the programmable binary counter means to the associated programmable master devices.

7. A method for synchronizing access to a data communication link between a plurality of programmable master devices which each have the capability of initiating a data transaction on said data communication link, wherein each one of said programmable master devices has a unique priority address representative of the priority of that programmable master device, and wherein each one of said programmable master devices is interfaced to an access channel communication link, said method comprising the following sequential steps which are performed by a programmable master device which desires to initiate a data transaction:
  - (a) determining if another programmable master device is trying to gain control of said data communication link or has gained control of said data communication link;
  - (b) driving said access channel to a first state if another programmable master device has not gained control and is not trying to gain control of said data communication link to thereby preset a timer associated with each one of said programmable master devices to a time representative of the unique priority address for the associated programmable master device;
  - (c) releasing said access channel to a second state wherein each one of said timers begin to count at the same time and at the same rate when said access channel is released to said second state;
  - (d) waiting until the associated timer has timed out and then determining if a higher priority programmable master device has driven said access channel to said first state; and
  - (e) driving said access channel to said first state and executing a data transaction if a higher priority programmable master device has not driven said access channel to said first state.

8. A method in accordance with claim 7 wherein said step of determining if another programmable master device is trying to gain control of said data communication link or has gained control of said data communication link comprises the sequential steps of:
- determining if the associated timer has timed out; and
- determining if said access channel is active, wherein a determination that the associated timer has not timed out is an indication that another programmable master device is trying to gain control of said data communication link and has caused the associated timer to be set to its unique priority address and to begin counting and wherein a determination that the access channel is active is an indication that another programmable master device has gained control of said data communication link.

9. A method in accordance with claim 8 wherein the following sequential steps are performed if it is determined that another programmable master device is trying to gain control of said data communication link;
- waiting until the associated timer has timed out and then determining if a higher priority programmable master device has driven said access channel to said first state; and driving said access channel to said first state and executing a data transaction if a higher priority programmable master device has not driven said access channel to said first state.

10. A method in accordance with claim 7 wherein steps a–d are repeated if a higher priority programmable master device has driven said access channel to said first state.

* * * * *